United States Patent [19]

Bosanec et al.

[11] Patent Number: 4,859,752

[45] Date of Patent: Aug. 22, 1989

[54] ALKENE/EXCESS MALEIC ANHYDRIDE POLYMER MANUFACTURE

[75] Inventors: Thomas P. Bosanec; Kenneth R. Lukow; Calvin J. Verbrugge, all of Racine, Wis.

[73] Assignee: S. C. Johnson & Son, Inc., Racine, Wis.

[21] Appl. No.: 96,106

[22] Filed: Sep. 11, 1987

[51] Int. Cl.$^4$ ............................................. C08F 2/00
[52] U.S. Cl. ..................................... 526/209; 526/88; 526/272
[58] Field of Search ..................... 526/272, 88, 209

[56] References Cited

U.S. PATENT DOCUMENTS

| | | |
|---|---|---|
| Re. 28,475 | 7/1975 | Blecke et al. .................... 526/272 X |
| 2,378,629 | 6/1942 | Hanford ............................ 526/272 |
| 2,430,313 | 11/1947 | Vang ................................. 526/272 |
| 2,527,081 | 10/1950 | Ross et al. ....................... 526/272 X |
| 2,542,542 | 2/1951 | Lippincott et al. ................ 526/272 |
| 2,729,451 | 4/1973 | Blecke et al. ..................... 526/272 |
| 2,857,365 | 10/1958 | Johnson ............................. 526/272 |
| 2,913,437 | 11/1959 | Johnson ............................. 526/272 |
| 2,921,928 | 1/1960 | Fields et al. ...................... 526/272 |
| 2,938,016 | 5/1960 | Johnson ............................. 526/272 |
| 2,980,653 | 4/1961 | Johnson ............................. 526/272 |
| 3,051,562 | 8/1962 | Gee et al. ......................... 525/353 X |
| 3,073,805 | 1/1963 | Reinhard ........................... 526/272 |
| 3,073,806 | 1/1963 | Reinhard ........................... 526/272 |
| 3,083,189 | 3/1963 | Reinhard ........................... 526/272 |
| 3,178,395 | 4/1965 | Muskat .............................. 526/272 X |
| 3,261,798 | 7/1966 | Farley ............................... 525/344 X |
| 3,264,272 | 8/1966 | Rees ................................. 525/221 X |
| 3,311,596 | 3/1967 | Berding et al. ................... 526/272 X |
| 3,380,972 | 4/1968 | LeBlanc et al. .................. 526/272 |
| 3,393,168 | 7/1968 | Johnson ............................. 526/272 |
| 3,461,108 | 8/1969 | Heilman et al. ................... 526/272 |
| 3,488,311 | 1/1970 | Burdick et al. ................... 524/517 |
| 3,532,656 | 10/1970 | Burdick et al. ................... 526/272 |
| 3,553,177 | 1/1971 | Hazen et al. ...................... 526/208 |
| 3,560,455 | 2/1971 | Hazen et al. ...................... 526/272 |
| 3,560,456 | 2/1971 | Hazen et al. ...................... 526/272 |
| 3,560,457 | 2/1971 | Hazen et al. ...................... 526/272 |
| 3,580,893 | 5/1971 | Heilman ............................. 526/272 |
| 3,642,726 | 2/1972 | Heilman ............................. 526/272 X |
| 3,706,704 | 12/1972 | Heilman ............................. 526/272 |
| 3,720,651 | 3/1973 | Imoto et al. ...................... 526/272 |
| 3,741,940 | 6/1973 | Heilman ............................. 526/272 |
| 3,755,264 | 8/1973 | Testa ................................ 526/232 X |
| 3,884,857 | 5/1975 | Ballard et al. .................... 526/272 X |
| 3,962,195 | 6/1976 | Moczygemba et al. ............ 526/11.1 |
| 4,068,776 | 1/1978 | Wszolek ............................ 526/272 |
| 4,071,581 | 1/1978 | Yokoyama ......................... 526/272 X |
| 4,072,621 | 2/1978 | Rose ................................. 252/89 R |
| 4,083,794 | 4/1978 | Lee et al. ......................... 252/99 |
| 4,151,069 | 4/1979 | Rossi ................................ 208/33 |
| 4,151,336 | 4/1974 | Sackmann et al. ................ 526/15 |
| 4,180,637 | 12/1979 | Evani et al. ....................... 526/272 X |
| 4,192,930 | 3/1980 | Beck et al. ....................... 525/227 |
| 4,202,955 | 5/1980 | Gaylord ............................. 526/272 |
| 4,240,916 | 12/1980 | Rossi ................................ 252/56 D |
| 4,250,289 | 2/1981 | Denzinger et al. ............... 526/272 |
| 4,358,573 | 11/1982 | Verbrugge ......................... 526/272 |
| 4,414,355 | 11/1983 | Pokorny ............................ 524/462 |
| 4,522,992 | 6/1985 | Verbrugge ......................... 526/272 |
| 4,526,950 | 7/1985 | Grava ................................ 526/272 |
| 4,529,787 | 7/1985 | Schmidt et al. ................... 526/317 |
| 4,613,464 | 9/1986 | Sandrick ........................... 526/272 |
| 4,628,071 | 12/1986 | Morgan .............................. 524/832 |
| 4,748,196 | 0/0000 | Kuroda et al. . |

FOREIGN PATENT DOCUMENTS

| | | |
|---|---|---|
| 54-75487 | 6/1979 | Japan . |
| 1414918 | 11/1975 | United Kingdom . |
| 1525114 | 9/1978 | United Kingdom . |

OTHER PUBLICATIONS

*Macromolecular Syntheses,* Overberger, ed., vol. 1, 1963, pp. 42–45.

*Primary Examiner*—Joseph L. Schofer
*Assistant Examiner*—J. M. Reddick

[57] ABSTRACT

Disclosed is a method of making a polymer containing more than 50 to about 95 mole percent, preferably 65 to 80 mole percent, of units derived from maleic anhydride and the balance units derived from at least one 1-alkene. The method comprises mixing the maleic anhydride and 1-alkenes selected in the presence of a thermally decomposable initiator and, optionally, in the presence of a solvent at a temperature ranging between 145° C. to 200° C., in such a manner that throughout the process, the ratio of maleic anhydride to 1-alkenes is more than 50:50 to about 95:5, most preferably between 65:35 to 80:20, to form a reaction mixture and thereafter maintaining the reaction mixture at from 145° C. to 200° C. until a polymer containing more than 50 mole percent of maleic anhydride is obtained. In an alternative embodiment, the method further comprises preparing a precharge of maleic anhydride and the 1-alkenes selected in more than a 50:50 to about 95:5 molar ratio, heating the precharge to 145° C. to 200° C. and thereafter mixing the remaining reactants into the precharge.

16 Claims, No Drawings

ALKENE/EXCESS MALEIC ANHYDRIDE POLYMER MANUFACTURE

BACKGROUND OF THE INVENTION

1. Field of the Invention

This invention relates to a method for making 1-alkene/maleic anhydride addition polymers which contain more than an equimolar amount of maleic anhydride through the use of a proportional feed process for mixing the monomers at a reaction temperature which is at least 145° C. and to the addition polymer obtained by that process.

2. Description of the Prior Art

Those skilled in the art have commonly believed that polymers of maleic anhydride and 1-alkenes only form polymers containing approximately equimolar ratios of maleic anhydride and 1-alkenes (also known as "alpha-olefins").

For example, U.S. Pat. No. 3,461,108 to Heilman et al. teaches that copolymers of maleic anhydride and an aliphatic olefin such as 1-hexene can be reacted in molar ratios of olefin to maleic anhydride varying from 0.1:1 to 100:1. However, Heilman et al. teaches that the result is a copolymer product that is essentially a chain of alternate groupings of maleic anhydride and the olefinic monomer reactants even though much higher or lower ratios of olefin to maleic anhydride than 1:1 were used. Heilman et al. teaches that the reaction temperatures to make such polymers are between 20° C. and 200° C., with preferred temperatures between 50° C. and 120° C. Examples 17 and 18 of this Heilman, et al. patent teach reacting 100 moles of maleic anhydride with 1 mole of 1-hexene at 60° C. for 165 hours to obtain a large, semi-solid gummy agglomerated mass. No analysis of the resulting mass is reported in those examples. Various methods for bringing the reactants together are taught such as by mixing all of the reactants together in a batch system or by adding the olefin intermittently or continuously to the reaction pot.

Similar teachings with regard to processing, molar ratios, and the equimolar composition of the final product for polymers of maleic anhydride with other 1-alkenes are found in Hazen, et al. U.S. Pat. Nos. 3,553,177; 3,560,455; 3,560,456; and 3,560,457 and in Heilman, et al. U.S. Pat. No. 3,706,704, all of which are assigned to Gulf Research & Development Company, as is U.S. Pat. No. 3,461,108. U.S. Pat. No. 2,938,016 to Johnson (Monsanto Chemical Company) has a similar statement about equimolar nature of the final product, but Examples 34, 35 and 39 employ an initial excess of maleic anhydride and more olefin is then added during the process.

U.S. Pat. No. 4,358,573 to Verbrugge teaches that terpolymers of maleic anhydride and alpha olefins containing a small excess of maleic anhydride relative to total alpha olefin can be obtained under certain conditions such as when high initiator levels are used. Verbrugge teaches terpolymers containing up to 60 mole percent of maleic anhydride although his examples teach adding molten maleic anhydride and initiator dropwise to a flask containing solvent and alpha olefins that was heated to 160° C.

U.S. Pat. No. 4,522,992 to Verbrugge contains similar teachings with regard to terpolymers containing maleic anhydride, an aromatic monoalkenyl monomer such as styrene and a 1-alkene having at least 18 carbon atoms. However, the process used is different since, in the Examples, one alkene is placed in a flask with solvent and heated to 140° C. The maleic anhydride is placed in one dropping funnel and the aromatic monomer and initiator is placed in a second dropping funnel. The contents of the dropping funnels are slowly added to the heated flask over a period of time.

U.S. Pat. No. 3,178,395 to Muskat teaches use of peroxide catalysts in excess of 2% coupled with temperatures in excess of 90° C. where the monomers reacted are in the molar ratio of 1:2 to 2:1 olefin to maleic anhydride to result in a product which usually has a molar ratio of substantially 1:1.

U.S. Pat. No. 2,542,542 to Lippincott et al. teaches reacting maleic anhydride with 1-alkenes at 100° to 200° C. using a peroxide catalyst where the presence and nature of the solvent used changed the molar ratio of maleic anhydride to 1-alkene in the product.

Contrary to accepted beliefs, U.S. Pat. No. 4,192,930 to Beck, et al. teaches that the copolymers used are preferably those comprising maleic anhydride and olefins in a molar ratio of 0.8:1 to about 1.8:1 and states that such are known in the art, yet no specific examples of the manufacture of polymers having greater than 1:1 molar ratios of maleic anhydride to olefins are given. U.S. Pat. No. 4,072,621 to Rose teaches that the ratio of maleic anhydride to vinyl alkyl ether or 1-alkenes having 1-4 carbon atoms in the polymers useful in his invention is from 2:1 to 1:2, but does not give examples showing how to make polymers containing greater than equimolar ratios of maleic anhydride.

U.S. Pat. No. 3,261,798 to Farley teaches maleic anhydride/alpha-olefin copolymers where the reactants are added in a molar ratio of 1:1 to 1:9 (maleic anhydride excess) made at 130° C. to 180° C. in solvent using dialkyl peroxides. Use of a solvent is said to result in inclusion of greater than stoichiometric amounts of maleic anhydride in the product such as 1:1.43. Example 1 of the Farley patent teaches adding all of the olefin mixture and one half of the initiator to the reaction vessel and then adding the remainder of the initiator and the maleic anhydride to the flask over a period of time at 140°-145° C. No analysis of the polymer was reported.

U.S. Pat. No. 4,083,794 to Lee, et al. teaches the use of copolymers of maleic anhydride with a monoethylenically unsaturated monomer or mixture of monomers such as ethylene or propylene as well as methyl methacrylate or styrene where the molar ratio of maleic anhydride to unsaturated monomer is from 2.5:1 to 100:1, preferably from 2.5:1 to 30:1 and more preferably, from 2.5:1 to 7:1. Examples 8 and 9 employed 2.5 moles of maleic anhydride to 1 mole of ethylene and propylene, respectively, but these examples were written in the present tense. The copolymers and their production are said to be taught in British Pat. No. 1,414,918 which teaches copolymers of various olefin monomers and maleic anhydride in the above proportions having a molecular weight of between about 300–1000, but only teaches ethylene and propylene as 1-alkenes and provides no working examples other than the same disclosure of Examples 8 and 9 of the '794 patent. The British '918 patent prefers copolymers of acrylic or methacrylic acid and their derivatives or styrene as agents to prevent boiler scale formation.

U.S. Pat. No. 3,755,264 to Testa teaches production of copolymers of acrylic acid, styrene or vinyl acetate with maleic anhydride where the copolymers contain 99 to 85 mole percent of maleic anhydride by using a large amount of free-radical initiator (at least 6% by weight) by adding the monomer incrementally to maleic anhydride at 100° C. to 145° C. It does not suggest using 1-alkenes in this process.

U.S. Pat. No. 3,264,272 to Rees teaches a method of making low molecular weight copolymers of maleic anhydride and alpha-olefins, preferably styrene, which are free of homopolymers of the alpha-olefin and contain an excess of the olefin. The invention involves using higher temperatures such as greater than 140° C. while feeding the styrene and maleic anhydride into a reactor together dissolved in solvent.

None of the above patents appear to recognize what we have discovered with regard to making polymers of maleic anhydride and 1-alkenes that contain more than an equimolar amount of maleic anhydride, and preferably greater than 60 mole percent of maleic anhydride.

SUMMARY OF THE INVENTION

One object of this invention is to provide a method which permits more flexibility in attaining free radical addition polymers having preselected molar ratios of units derived from maleic anhydride and one or more 1-alkenes where the units derived from maleic anhydride are more than 50 mole percent of the polymer.

Another object of the present invention is to provide a method for making such addition polymers wherein the units derived from maleic anhydride comprise at least 55, and more preferably, at least 60 mole percent and on up to about 95, and most preferably, 65 up to 80, mole percent of the polymer.

A further object of the present invention is to provide a method for making such addition polymers wherein the reacted maleic anhydride is relatively evenly distributed throughout the resulting polymer rather than forming a mixture of alternating copolymer of maleic anhydride and 1-alkene and significant amounts of undesirable polymaleic anhydride.

These and other objects and advantages of the present invention are provided by a method comprising the steps of (A) mixing a maleic anhydride or an analog thereof with at least one 1-alkene selected from the group consisting of 1-alkenes having from 4 to 30+ carbons atoms, more preferably from 6 to 18 carbon atoms, in the presence of an effective amount of a thermally decomposable initiator such as one or more peroxide compounds such as di(tertiary-butyl) peroxide and tertiary-butyl perbenzoate, to initite the polymerization reaction at a temperature of from about 145° C. to 200° C., more preferably between 160° C. and 180° C., to form a reaction mixture wherein the molar ratio of maleic anhydride to total 1-alkene present is maintained at a ratio of more than 50:50 up to about 95:5, and more preferably 55:45 up to about 95:5 and most preferably at least 65:35 up to about 80:20, during the course of the reaction; and (B) thereafter maintaining the reaction mixture at a temperature of from about 145° C. to 200° C., more preferably between 160° C. to 180° C., until a polymer containing more than 50 mole percent, and preferably at least 55 to 60, up to 95 mole percent, and most preferably from 65 mole percent up to about 80 mole percent, of maleic anhydride or analog thereof is obtained.

More preferably, a solvent such as PM acetate is present during one of the steps such as wherein the mixing of the maleic anhydride, 1-alkene and initiator are conducted in the presence of a solvent. In a more preferred embodiment, a precharge of the maleic anhydride and 1-alkene is prepared and the remaining reactants and initiator are fed into the heated precharge.

This invention also relates to the addition polymer obtained according to the process described herein.

DETAILED DESCRIPTION OF THE PREFERRED EMBODIMENT

The anhydride used in the method of the present invention is most preferably pure maleic anhydride. However, other maleic anhydride analogs can be utilized such as methylmaleic anhydride, dimethylmaleic anhydride, fluoromaleic anhydride, methylethylmaleic anhydride and the like. Accordingly, as employed herein, the term "maleic anhydride" includes such analogs in whole or in part. It is preferred that the anhydride be substantially free of acid and the like before polymerization.

The 1-alkenes suitable for use in the method of the present invention have from 4 to 30+ carbon atoms and include the following: 1-butene; 1-pentene; 1-hexene; 1-heptene; 1-octene; 1-nonene; 1-decene; 1-dodecene; 1-tetradecene; 1-hexadecene; 1-heptadecene; 1-octadecene; 2-methyl-1-butene; 3,3-dimethyl-1-pentene; 2-methyl-1-heptene; 4,4-dimethyl-1-heptene; 3,3-dimethyl-1-hexene; 4-methyl-1-pentene; 1-eicosene; 1-docosene; 1-tetracosene; 1-hexacosene; 1-octacosene; 1-triacontene; 1-dotriacontene; 1-tetratriacontene; 1-hexatriacontene; 1-octatriacontene; 1-tetracontene; 1-dotetracontene; 1-tetratetracontene; 1-hexatetracontene; 1-octatetracontene; 1-pentacontene; 1-hexacontene and mixtures thereof.

Those skilled in the art will appreciate that the 1-alkenes can be used in the form of pure materials such as 1-hexene or 1-octadecene or can be mixtures of various alkenes. This is particularly true for the higher alkenes where it is preferred for economic reasons to use mixtures of the higher 1-alkenes (i.e., those having more than about 20 carbon atoms per molecule—"$C_{20+}$ 1-alkenes"). For example, a mixture of $C_{30+}$ 1-alkenes which is described in U.S. Pat. No. 3,553,177 can be used. As noted in that patent, a mixture of even chain length 1-alkenes is obtained. Another mixture of higher alkenes is a mixture of $C_{20}$ to $C_{24}$ 1-alkenes which is commercially available from Gulf Oil (Chevron Corp.). The 1-alkenes used should be essentially monoolefinic because diolefins cause gel formation and cross-linking. Small amounts of diolefins, typically less than 2 percent by weight, can be tolerated as a impurity in the higher 1-alkene monomer.

More preferably, the 1-alkenes employed are those having from 6 to 18 carbon atoms per molecule such as 1-hexene, 1-decene, 1-tetradecene and 1-octadecene.

In another preferred embodiment, at least two different 1-alkenes are used such as a combination of at least one 1-alkene selected from lower 1-alkenes having from 4 to 16 carbon atoms and more preferably from 6 to 10 carbon atoms and at least one 1-alkene selected from higher alkenes having at least 18 carbon atoms and more preferably, 1-octadecene, a mixture of $C_{20}$ to $C_{24}$ 1-alkenes or a mixture of $C_{30+}$ 1-alkenes as is taught in U.S. Pat. No. 4,358,573.

The ratios of maleic anhydride and 1-alkenes have already been described above. To obtain a product having a significant amount of maleic anhydride incorporated therein, the preferred ratios of maleic anhydride to total 1-alkenes are 55:45 to 95:5, more preferably a 60:40 to about 95:5 molar ratio and most preferably a 65:35 to 80:20 molar ratio.

To effect addition polymerization of the maleic anhydride with the 1-alkenes, at least one thermally decomposable initiator is employed which is effective at the 145° C. or greater reaction temperatures used in the present invention. These initiators are well known in the art and include peroxides, hydroperoxides and azo compounds which generate free radicals upon being heated to initiate polymerization through the unsaturated radicals present in the reactants. Examples of such initiators are tertiary-butyl perbenzoate, di(tertiary-butyl)peroxide, tertiary-butyl peroxypivalate, tertiary-butyl peroctoate, tertiary-butyl peroxy neodecanoate, tertiary-amyl peroxypivalate, benzoyl peroxide, 2,5-dimethyl-2,5-di(tertiary-butyl peroxy)hexyne-3, cumene hydroperoxide, acetyl hydroperoxide, diacetyl peroxide, diethylperoxy carbonate, lauroyl peroxide, tertiary-butyl hydroperoxide, para-bromobenzene diazonium fluoborate, para-tolyl diazoaminobenzene, para-bromobenzene diazonium hydroxide, azo-methane and the phenyldiazonium halides.

Specific initiators are chosen with respect to their half-life at the reaction temperatures to be used, reactivity with unsaturated monomers and solubility in the reaction mixture and any solvent to be used in the process in a manner known to those of ordinary skill in the art. While the actual amount of such initiators used is not critical, a sufficient amount must be employed to result in substantially complete conversion of the monomers to polymer. Generally, from 0.5 to 6 mole percent of initiator based on the total moles of unsaturated reactants present is employed, and, more preferably, from 1 to 3 mole percent initiator. The initiator is generally dissolved in the 1-alkene which is added in the manner described below to the reactor during the process although it can also be added to the reactants neat or in the form of a solvent solution over a period of time. A presently preferred initiator is di(tertiary-butyl)peroxide.

One or more solvents can be used in the process of the present invention to promote reaction between the maleic anhydride and the 1-alkenes and to reduce the viscosity of the reaction mixture as the polymer is formed. The solvent should be one in which the monomeric reactants are soluble, and generally should be inert with respect to the reactants, but should be a liquid and stable at the pressures used and at the relatively high reaction temperatures used in the method of the present invention. Thus, the solvent or solvents employed should not be a solvent having groups that are reactive with anhydride radicals such as those containing hydroxyl, carboxyl or aldehyde radicals because such solvents would tend to react with any maleic anhydride present. One presently preferred solvent for use in making the compositions of the present invention is "PM acetate" which is propylene glycol monomethyl ether acetate. Examples of other solvents are as follows: aliphatic and alicyclic halogen-containing compounds such as dichloromethane and 1,3-dichloropropane, aromatic esters such as dimethyl phthalate, aromatic hydrocarbons such as toluene and the various isomers of xylene, halogenated aromatic compounds such as chlorobenzene, and aliphatic esters and ketones such as butyl acetate and methyl isobutyl ketone.

In carrying out the method of the present invention, it is important that the molar ratio of the maleic anhydride to the 1-alkene be such that the maleic anhydride is proportionally kept in excess throughout the process of adding it to the 1-alkene in the presence of the initiator and that the mixing be accomplished in such a manner that the reaction takes place at from 145° C. to 200° C., and more preferably, from 160° C. to 180° C. It is these conditions which result in a polymer product in which the maleic anhydride is substantially randomly distributed throughout the polymer formed rather than resulting in a mixture of alternating copolymer of maleic anhydride and 1-alkene and a substantial amount of the excess maleic anhydride present as polymaleic anhydride chains.

The method of the present invention is the preferred method of making the polymers claimed in copending U.S. patent application Ser. No. 07/095,799 entitled "1-Alkene/Excess Maleic Anhydride Polymers" filed concurrently herewith in the names of F. L. Billman, L. Shih and C. J. Verbrugge which is assigned to the same assignee as is the present invention and is hereby incorporated by reference.

Another related application which teaches a continuous process for making copolymers of maleic anhydride and 1-alkenes is U.S. patent application Ser. No. 07/084,044 entitled "Continuous Process and System for Producing Polymers Comprising Maleic Anhydride and Certain Alpha-Olefins" which was filed on Aug. 11, 1987 in the names of Franck E. Benhamou, Kenneth R. Lukow and Calvin J. Verbrugge and is assigned to the same assignee as is the present invention. The present invention is concerned with a batch process for producing maleic anhydride/1-alkene polymers while the above application to Benhamou, et al. is concerned with a continuous process.

One first determines the molar ratio of maleic anhydride to 1-alkene desired in the polymer to be made. It is assumed that the final polymer generally have a molar ratio of units derived from maleic anhydride to 1-alkene which is close to the starting molar ratio if loss of reactants during processing is controlled. Having selected a starting formulation, the method of the present invention can be practiced in several ways. In one procedure, the maleic anhydride is charged to a heated supply tank and is heated to its melting point or slightly above to provide a fluid mixture which can be introduced to a heated reactor vessel which has been blanketed with inert gas to exclude oxygen. The 1-alkene or mixture of several selected is charged to a separate supply tank and the initiator is added to the 1-alkene to accomplish even introduction of the initiator during the reaction.

Alternatively, the initiator can be metered into the reactor vessel from a separate supply tank, neat or diluted in a solvent which does not react with the other reactants. As noted above, the initiator is selected in accordance with well known techniques so that it has sufficient activity at the reaction temperature to be used to accomplish essentially complete polymerization of the reactants. Preferably, from 1 to 3 mole percent of one or a combination of initiators based on the moles of unsaturated reactants present in used with higher amounts resulting in more complete conversion to polymer.

If a solvent is used, the maleic anhydride can also be dissolved in the solvent and metered into the heated reactor vessel. The 1-alkene could also be combined with a solvent.

As noted above, the maleic anhydride and 1-alkene are proportionally metered into the heated reactor vessel containing a portion of the solvent in such a manner as to maintain an excess molar ratio of maleic anhydride relative to the 1-alkene. In place of a solvent in the heated reactor vessel, a precharge (as described below) could be present or a preformed polymer of maleic anhydride/1-alkene from a previous reaction could be present to provide a heated medium in which the reaction can take place. Metering is done at a rate which is substantially equal to the rate of reaction of the reactants to insure that units of maleic anhydride are substantially randomly dispersed throughout the polymer obtained. In manufacturing polymers with greater than about 80 mole percent of maleic anhydride, it is desirable to match the mole ratio of maleic anhydride charged to total 1-alkene so that there is at least one unit of 1-alkene per polymer chain based on the number average molecular weight of the polymer product as is described in the copending application of Billman, Shih and Verbrugge noted above that was incorporated by reference to teach such formulations.

The reaction pressure can be atmospheric, but superatmospheric pressures are preferred with the exact pressure being dependent upon the vapor pressure of the reactants and solvent in view of the temperature and type of initiators used and can be determined by techniques known to those of ordinary skill in the art.

The maleic anhydride and 1-alkene or mixture thereof are reacted at a temperature of at least 145° C. up to about 200° C. with 160° C. to 180° C. being more preferred. The use of these relatively high temperatures from one of the novel aspects of the present invention. These conditions appear to force the production of polymers containing a more random distribution of the molar excess of maleic anhydride throughout the polymer. This is in contrast to producing a mixture of essentially alternating copolymer of maleic anhydride and 1-alkene and excess maleic anhydride in the form of polymaleic anhydride. The reactants and initiator can be metered into a heated reactor vessel filled with solvent such as PM acetate or a mixture of solvents.

A more preferred embodiment will now be described which further provides a means by which solventless production of polymers can be accomplished. A precharge of a minor portion, preferably about 10%, of the total amount of maleic anhydride and 1-alkene having the preselected molar ratio of maleic anhydride to 1-alkene is charged to the reactor vessel and heated to the reaction temperature selected under a blanket or pressurizing amount of inert gas such as nitrogen. The remaining maleic anhydride and 1-alkene is charged to supply tanks along with the initiator as described above. A solvent can optionally be included in the precharge or distributed between the precharge and the reactants to be combined from the supply tanks.

The process then involves mixing the maleic anhydride together with the 1-alkene or mixture thereof into the reactor vessel at a rate which is substantially equal to the reaction rate of the reactants, but at such a rate that temperature in the reaction vessel remains controllable since the reaction is exothermic. Generally the metering of the reactants is accomplished over a period of about 1 to 3 hours and thereafter the reaction mixture formed is maintained at the preselected reaction temperature for about 30 minutes to 1 hour to insure complete conversion of monomeric reactants to polymer.

The polymer obtained can be used in solution form if a solvent was present or can be stripped of any solvent and free monomer by vacuum drying, by heating in an oven or using a thin film evaporator to obtain a dry polymeric product which can range from a waxy material to a brittle resinous product. The dry product can be redissolved in an organic solvent or added to an aqueous alkaline solution containing ammonium hydroxide or other alkali to hydrolyze the anhydride radicals present and form an aqueous resin cut according to procedures well known to those skilled in the art.

The polymeric product itself can be used for the same purposes as are other maleic anhydride/1-alkene copolymers such as additives to floor polishes, mold release agents and the like. Another advantage of the excess maleic anhydride/1-alkene polymer made in accordance with the present invention is that the polymers have greater solubility in water than typically 1:1 molar ratio alternating copolymers of maleic anhydride aand 1-alkenes. As described further in Billman, Shih and Verbrugge patent application, this provides a formulator with the opportunity to use polymers containing higher molecular weight 1-alkenes in place of polymers utilizing lower molecular weight 1-alkenes. This is an advantage since it is recognized that it is more difficult and expensive to manufacture lower alkenes such as 1-butene and 1-hexene with maleic anhydride than with higher alkenes such as 1-decene or 1-octadecene.

The term "e,ovs/M/ z" as used herein means the molecular weight measure for polymers, also sometimes referred to as the "sedimentation average molecular weight", as defined in U.S. Pat. No. 4,529,787 to Schmidt, et al. (assigned to the same assignee as the present invention) which is hereby incorporated by reference to teach the meaning of such a measurement.

The following examples are offered to illustrate the invention and facilitate its understanding without limiting the scope or spirit of the invention. Unless otherwise indicated, all parts and percentages reported are by weight.

EXAMPLES 1–5

Examples 1–3 illustrate the laboratory scale production of polymers containing a 2:1 molar ratio of maleic anhydride to 1-alkene by the method of the present invention and Examples 4–5 show the production of 1.5:1 molar ratio polymers.

The composition used in Example 1 was 140 grams (g.) (1 mole) 1-decene, 196 g. (2 moles) maleic anhydride, 224 g. propylene glycol monomethyl ether acetate (hereinafter "PM acetate"), 4.386 g. (1 mole %) di(tertiary-butyl)peroxide initiator (hereinafter "DTBP"), and 1.94 g. (0.33 mole %) tertiary-butyl perbenzoate initiator (hereinafter "TBPB").

The composition used in Example 2 was 196 g. (1 mole) 1-tetradecene, 196 g. (2 moles) maleic anhydride, 261.3 g. PM acetate, 4.386 g. DTBP, and 1.94 g. TBPB.

The composition used in Example 3 was 252 g. (1 mole) 1-octadecene, 196 g. (2 moles) maleic anhydride, 298.7 g. PM acetate, 4.386 g. DTBP, and 1.94 g. TBPB.

The composition used in Example 4 was 196 g. (1 mole) 1-tetradecene, 147 g. (1.5 moles) maleic anhydride, 229 g. PM acetate, 3.655 g. DTBP, and 1.94 g. TBPB.

The composition used in Example 5 was 252 g. (1 mole) 1-octadecene, 147 g. (1.5 moles) maleic anhydride, 266 g. PM acetate, 3.635 g. DTBP, and 1.94 g. TBPB.

The procedure used to prepare each polymer was to charge all of the PM acetate into a 1000 ml., 4-necked round bottom flask equipped with a stirrer, nitrogen sparge tube, thermometer, reflux condenser, and two addition funnels. The maleic anhydride was charged into one dropping funnel and was heated with a heating tape to melt the maleic anhydride. The 1-alkene was poured into the other addition funnel along with both initiators. The stirrer was started and the solvent in the flask was heated to 160° C. with nitrogen sparging to exclude air from the flask. The contents of the addition funnels were added to the stirring solvent dropwise over a period of one hour. The temperature of the reaction mixture was between 148° C. and 154° C. at the end of the addition. The contents of the flask was held at between 148° C. to 158° C. for an additional period of 90 minutes at which time a colorless to yellowish transparent solution was observed in the flask. The contents of the flask was then poured out into a flat, open aluminum tray and placed in a 70° C. forced air draft oven overnight to obtain a dry polymer product.

Since these reactions were run in laboratory glassware that could not be pressurized, the reaction was limited to the reflux temperature of the solvent. Therefore, two initiators were used to provide a sufficient free radical flux to produce the polymers.

The molecular weights of the resulting polymers were determined using a gel permeation chromatography method with polystyrene standards, an elemental analysis of the polymers of Example 1–3 was performed and the results are reported in Table I. Based on the elemental analysis of the polymers, the ratio of units derived from maleic anhydride to those derived from the 1-alkene used was calculated and the results are also reported in Table I.

TABLE I

| Example No. | 1 | 2 | 3 | 4 | 5 |
|---|---|---|---|---|---|
| $\overline{M_n}^1$ | 2240 | 1540 | 2620 | 2720 | 2590 |
| $\overline{M_w}^2$ | 3850 | 2660 | 4130 | 4650 | 3980 |
| $\overline{M_z}^3$ | 5690 | 3930 | 5650 | 6980 | 5430 |
| $\overline{M_w}/\overline{M_n}$ | 1.72 | 1.73 | 1.58 | 1.71 | 1.54 |
| $\overline{M_z}/\overline{M_n}$ | 2.54 | 2.55 | 2.16 | 2.57 | 2.10 |
| % Carbon | 58.51 | 64.59 | 67.43 | — | — |
| % Hydrogen | 8.02 | 8.40 | 9.64 | — | — |
| % Oxygen | 32.51 | 26.60 | 22.37 | — | — |
| % MAH[4] | 75.9 | 71.0 | 69.0 | — | — |
| % 1-alkene[5] | 24.1 | 29.0 | 31.0 | — | — |

"—" means not determined.
[1] Number average molecular weight.
[2] Weight average molecular weight.
[3] Sedimentation average molecular weight.
[4] Mole percent maleic anhydride units in polymer calculated from elemental analysis.
[5] Mole percent 1-alkene units in polymer calculated from elemental ana;ysis.

The theoretical amount of maleic anhydride expected assuming complete conversion to polymer in Examples 1–3 was 2 moles maleic anhydride units per mole of 1-alkene units or 66.67 mole percent. For example 1, the theoretical amount of oxygen expected (assuming complete conversion and no losses of reactants) was 28.6% based on the initial moles of maleic anhydride charged. The analysis showed 32.51% oxygen corresponding to 114% over theoretical; taking the analysis of all three elements into consideration, this corresponds to 75.9% maleic anhydride versus 66.67% theoretical. For example 2, the theoretical oxygen content expected was 24.5%, and the analysis showed 26.60% corresponding to 109% over theoretical or 71.0% maleic anhydride unit content. For Example 3, the theoretical oxygen content expected was 21.4% and the analysis showed 22.37% corresponding to 104% over theoretical or 69.0% maleic anhydride unit content. The analyses showed that as higher carbon content 1-alkenes were used, the results came closer to the theoretical amount expected. The above results show that for the laboratory batches prepared, the actual amount of maleic anhydride units obtained from the analysis was in excess of the molar ratios charged, possibly due to a loss of some of the 1-alkene during processing which was done at atmospheric pressure using a reflux condenser. Thus, the process of the present invention results in polymers which have substantially more maleic anhydride incorporated into the polymer than has previously been described and demonstrated by way of experimental examples containing analyses in the prior art known to the Applicants.

The theoretical amount of maleic anhydride expected assuming complete conversion to polymer in Examples 4–5 was 1.5 moles per mole of 1-alkene or 60 mole percent.

EXAMPLES 6–7

These Examples illustrate the pilot plant scale production of polymers containing a 1.5:1 molar ratio of maleic anhydride to 1-alkene by the method of the present invention which further illustrates the use of a precharge of maleic anhydride and 1-alkene. Example 7 used a higher level of initiator than did Example 6.

The composition used in Example 6 was 33.7 pounds of 1-decene (NEODENE 10 from Shell Chemical Company) (109.24 moles), 35.4 pounds (163.86 moles) maleic anhydride, 0.88 pounds (399 g.—1 mole % based on the amount of total moles of maleic anhydride and 1-decene present) DTBP initiator, and 30.0 pounds PM acetate.

In Example 6, a 100 pound capacity, steam-heated reactor equipped with a stirrer, reflux condenser, two feed tanks and a nitrogen inlet tube was charged with a precharge consisting of 3.3 pounds of 1-decene, 3.5 pounds of maleic anhydride and 29 pounds of PM acetate. The reactor was purged with nitrogen gas to remove oxygen and blanketed and pressurized with nitrogen gas to 10 psig (pounds per square inch gauge). The remainder of the 1-alkene was charged to one of the feed tanks along with the initiator. The remainder of the maleic anhydride was charged to the other feed tanks which was heat jacketed and the heat was turned on to melt the maleic anhydride. The contents of the reactor were heated to 320° F. (160° C.). At 320° F., the contents of each feed tank were simultaneously fed into the stirring contents of the reactor over a two hour period. The reaction mixture in the reactor was allowed to exotherm to 340° F. (171.1° C.) and held at that temperature during the 2 hour addition of the reactants. During the processing, the pressure in the reactor rose to about 40 psig. After the addition was completed, the 1-alkene/initiator feed line was flushed with 1 pound of PM acetate and the reaction mixture in the reactor was held at about 340° F. For an additional one half hour. The resulting polymer solution at 67.47% novolatile solids content was clear and yellow in color. The solution was analyzed for free monomer content and it contained 3.83% unreacted 1-decene and 0.19% maleic anhydride indicating that substantially all of the reactants were converted to polymer. The polymer was dried by pumping the product through an oil heated thin film evaporator at reduced pressure and elevated temperature. The dry polymer obtained was observed to be a clear, yellow, brittle resin which powdered easily. Sixty mole percent of units of maleic anhydride based on the intial amount of monomers charged was expected to be found in the polymer product.

The composition used in Example 7 was 33.3 pounds of 1-decene (NEODENE 10 from Shell Chemical Company) (107.88 moles), 35.0 pounds (161.83 moles) maleic anhydride, 1.739 pounds (789 g.—2 mole % based on the amount of total moles of maleic anhydride and 1-decene present) DTBP initiator, and 30.0 pounds PM acetate.

The same procedure was followed as described for Example 6 with the exceptions that 30 pounds of PM acetate was charged to the reactor and that 1 pound of 1-decene was held back and used to flush the initiator feed line (instead of PM acetate) after the 2 hour addition was completed. The resulting polymer solution had a nonvolatile solids content of 69.88%. The solution was analyzed for free monomer content and the results were that there was 0.9% 1-decene and no measurable free maleic anhydride content indicating that the reaction was substantially complete. The amount of units derived from maleic anhydride expected was 60 mole percent based on the initial amount of monomers charged. Thus, by increasing the initiator level, substantially complete conversion of the reactants to polymer was observed.

It has also been found to be helpful to flush the maleic anhydride lines with solvent to insure complete reaction of the monomer charged.

That which is claimed is:

1. A method for making a free radical addition polymer of maleic anhydride and at least one 1-alkene comprising the steps of (A) mixing maleic anhydride with at least one 1-alkene selected from the group consisting of 1-alkenes having from 4 to 30+ carbon atoms in the presence of an effective amount of a thermally decomposable initiator to initiate the polymerization reaction at a temperature of from about 145° C. to about 200° C. to form a reaction mixture wherein a major portion of the maleic anhydride and 1-alkene is proportionally added over a period of time at a rate which is substantially equal to the rate of reaction of the maleic anhydride and 1-alkene to form said reaction mixture and the molar ratio of maleic anhydride to total 1-alkene present is maintained at a ratio of at least 55:45 up to about 95:5 during the course of the mixing and reaction; and (B) thereafter maintaining the reaction mixture at a temperature of from about 145° C. to 200° C. until a polymer containing from 55 mole percent up to about 95 mole percent of maleic anhydride is obtained.

2. The method as claimed in claim 1 wherein the molar ratio of units derived from maleic anhydride to total units derived from all 1-alkene in the polymer obtained is in the range of from 65:35 to about 80:20 and the molar ratio of maleic anhydride to total 1-alkene during the mixing step is at least 65:35.

3. The method as claimed in claim 1 wherein a solvent is present during at least one of the steps.

4. The method as claimed in claim 3 wherein the mixing of the maleic anhydride, 1-alkene and initiator is conducted by adding the maleic anhydride, 1-alkene and initiator to a heated amount of the solvent.

5. The method as claimed in claim 1 which further includes the steps of first mixing a minor portion of the maleic anhydride and at least one 1-alkene together to form a precharge having said molar ratio and heating the precharge to from about 145° C. to 200° C. prior to adding the remaining maleic anhydride and 1-alkene together in said ratio along with the initiator into said precharge to form the reaction mixture.

6. The method as claimed in claim 1 wherein the precharge comprises a preformed polymer of maleic anhydride and at least one 1-alkene.

7. The method as claimed in claim 1 wherein each 1-alkene is selected from the group consisting of 1-alkenes having from 6 to 18 carbon atoms.

8. The method as claimed in claim 1 wherein at least two different 1-alkenes are employed.

9. The method as claimed in claim 5 wherein the molar ratio of units derived from maleic anhydride to total units derived from all 1-alkene in the polymer obtained is in the range of from 55:45 to about 95:5 and the molar ratio of maleic anhydride to total 1-alkene during the mixing step is at least 55:45.

10. The method as claimed in claim 5 wherein the molar ratio of units derived from maleic anhydride to total units derived from all 1-alkene in the polymer obtained is in the range of from 65:35 to about 80:20 and the molar ratio of maleic anhydride to total 1-alkene during the mixing step is at least 65:35.

11. The method as claimed in claim 10 wherein each 1-alkene is selected from the group consisting of 1-alkenes having from 6 to 18 carbon atoms.

12. The method as claimed in claim 11 wherein at least two different 1-alkenes are employed.

13. The method as claimed in claim 1 wherein the initiator is di(tertiary-butyl)peroxide.

14. The method as claimed in claim 1 wherein the temperature is from 160° C. to 180° C.

15. The method as claimed in claim 3 wherein the solvent is propylene glycol monomethylether acetate.

16. The method as claimed in claim 1 wherein the molar ratio of units derived from maleic anhydride to total units derived from all 1-alkene in the polymer obtained is in the range of from 60:40 to about 95:5 and the molar ratio of maleic anhydride to total 1-alkene during the mixing step is at least 60:40.

* * * * *